(12) United States Patent
Horitake

(10) Patent No.: US 11,203,378 B2
(45) Date of Patent: Dec. 21, 2021

(54) VEHICLE CONTROL DEVICE, CONTROL METHOD, AND NON-TRANSITORY COMPUTER READABLE MEDIUM

(71) Applicant: TOYOTA JIDOSHA KABUSHIKI KAISHA, Toyota (JP)

(72) Inventor: Sunao Horitake, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 288 days.

(21) Appl. No.: 16/424,850

(22) Filed: May 29, 2019

(65) Prior Publication Data

US 2020/0023888 A1 Jan. 23, 2020

(30) Foreign Application Priority Data

Jul. 20, 2018 (JP) ................ JP2018-136525

(51) Int. Cl.
- B62D 6/00 (2006.01)
- B62D 5/04 (2006.01)
- B60R 16/033 (2006.01)
- H02P 5/68 (2006.01)

(52) U.S. Cl.
CPC .......... *B62D 5/0463* (2013.01); *B60R 16/033* (2013.01); *B62D 5/0484* (2013.01); *H02P 5/68* (2013.01)

(58) Field of Classification Search
CPC .. B62D 5/0463; B62D 5/0484; B62D 5/0481; B62D 5/30; B62D 5/046; B62D 6/00; B60R 16/033; B60R 16/03; H02P 5/68; H02J 2310/40; H02J 7/34; H02J 1/10; H02J 1/00

USPC ........................................... 701/41
See application file for complete search history.

(56) References Cited

U.S. PATENT DOCUMENTS

| | | | | |
|---|---|---|---|---|
| 5,365,153 A | * | 11/1994 | Fujita | B60L 50/51 318/34 |
| 2011/0046830 A1 | * | 2/2011 | Bourqui | B60L 3/102 701/22 |
| 2012/0197841 A1 | * | 8/2012 | Laufer | G06F 16/70 707/618 |
| 2013/0113437 A1 | | 5/2013 | Ishibashi et al. | |

(Continued)

FOREIGN PATENT DOCUMENTS

| | | |
|---|---|---|
| CN | 103094952 A | 5/2013 |
| CN | 106697040 A | 5/2017 |

(Continued)

*Primary Examiner* — Shardul D Patel
(74) *Attorney, Agent, or Firm* — Oliff PLC (57) ABSTRACT

A control device performs steering control of a vehicle by electric power of a first battery and a second battery and includes a calculation unit that calculates a total torque to be produced and a distribution controller that controls output of the first motor and the second motor such that a sum of a first torque produced by the first motor and a second torque produced by the second motor is the total torque. When neither the first system nor the second system is defective, the distribution controller sets the first torque and the second torque based on a state of the first battery and a state of the second battery such that predetermined performance of the first battery and the second battery is within an allowable range.

7 Claims, 4 Drawing Sheets

(56) References Cited

U.S. PATENT DOCUMENTS

| | | | | |
|---|---|---|---|---|
| 2016/0006377 A1* | 1/2016 | Hashimoto | ............ | B60L 50/62 |
| | | | | 290/31 |
| 2017/0210414 A1* | 7/2017 | Sato | ............ | B62D 6/003 |
| 2017/0369094 A1* | 12/2017 | Ukai | ............ | H02P 29/032 |
| 2018/0086343 A1* | 3/2018 | Crain | ............ | B60L 58/20 |
| 2018/0167007 A1* | 6/2018 | Pallett | ............ | F02P 5/1504 |
| 2019/0092257 A1* | 3/2019 | Boecker | ............ | H02J 7/0029 |

FOREIGN PATENT DOCUMENTS

| | | |
|---|---|---|
| JP | 2017-038498 A | 2/2017 |
| JP | 2017-169384 A | 9/2017 |
| JP | 2018-016234 A | 2/2018 |

\* cited by examiner

VEHICLE CONTROL DEVICE, CONTROL METHOD, AND NON-TRANSITORY COMPUTER READABLE MEDIUM

INCORPORATION BY REFERENCE

The disclosure of Japanese Patent Application No. 2018-136525 filed on Jul. 20, 2018 including the specification, drawings and abstract is incorporated herein by reference in its entirety.

BACKGROUND

1. Technical Field

The disclosure relates to a vehicle control device, a control method, and a non-transitory computer readable medium storing a control program.

2. Description of Related Art

A vehicle in which an electric power steering apparatus is mounted has been widespread. In the electric power steering apparatus, motor that produce torque to an output shaft and controllers that control respective motors are provided in two systems, such that, even if one breaks down, the other is able to continue the operation (for example, see Japanese Unexamined Patent Application Publication Nos. 2017-169384 (JP 2017-169384 A), 2018-016234 (JP 2018-016234 A), and 2017-038498 (JP 2017-038498 A)).

SUMMARY

In the electric power steering apparatus having the two-system configuration, batteries are provided in the two systems. Accordingly, even if one of the batteries fails, the operation can be continued with the other battery. When the batteries are provided in one system, if both of the two systems for the motor and the controller are normal, control may be performed such that the torque of the same magnitude is produced from the motor of each system generally. However, when the batteries are provided in the two systems, the states of the batteries of the systems are not necessarily the same as each other. In this case, when the torque of the same magnitude is produced, there is a possibility that the load of the battery of one system is relatively large and so stable torque is difficult to be produced. For example, when the batteries are provided in the two systems, in order to prevent simultaneous failure due to the same causes, different batteries, for example, a lead battery is used for one and a lithium ion battery, which is a different kind of battery from the lead battery, is used for the other. Since the lead battery and the lithium ion battery differ in output performance depending on temperature, state of charge (SOC) (charging amount), and degree of deterioration, when the same torque is produced from the motor of each system, the voltage of the battery of one system is greatly reduced as compared with the other, and there is a possibility that the operation of the system is unstable.

The disclosure is to provide a control device for an electric power steering apparatus having two systems that each include a set of battery and motor, which is capable of improving the stability of operation.

A first aspect of the disclosure relates to a control device that is connected to a first system and a second system. The first system includes a first battery, a first battery monitoring unit that monitors a state of the first battery, and a first motor that produces torque for steering by electric power of the first battery, and the second system includes a second battery, a second battery monitoring unit that monitors a state of the second battery, and a second motor that produces torque for steering by electric power of the second battery. The control device is configured to perform steering control of a vehicle by the electric power of the first battery and the second battery. The control device includes a calculation unit configured to calculate a total torque to be produced and a distribution controller configured to control output of the first motor and the second motor such that a sum of a first torque produced by the first motor and a second torque produced by the second motor is the total torque. The distribution controller is configured to, when the first system is defective, cause the second motor to produce the total torque, when the second system is defective, cause the first motor to produce the total torque, and when neither the first system nor the second system is defective, acquire first information indicating the state of the first battery from the first battery monitoring unit, acquire second information indicating the state of the second battery from the second battery monitoring unit, set the first torque and the second torque based on the first information and the second information such that predetermined performance of the first battery and the second battery is within an allowable range, cause the first motor to produce the first torque, and cause the second motor to produce the second torque.

The control device according to the first aspect, the control device may include a first controller included in the first system and a second controller included in the second system. The calculation unit may include a first calculation unit provided in the first controller and configured to calculate the total torque by the electric power of the first battery, and a second calculation unit provided in the second controller and configured to calculate the total torque by the electric power of the second battery. The distribution controller may include a first distribution controller provided in the first controller and configured to control the output of the first motor by the electric power of the first battery, and a second distribution controller provided in the second controller and configured to control the output of the second motor by the electric power of the second battery. When the first system is defective, the second distribution controller may be configured to cause the second motor to produce the total torque calculated by the second calculation unit, when the second system is defective, the first distribution controller may be configured to cause the first motor to produce the total torque calculated by the first calculation unit, and when neither the first system nor the second system is defective, both the first distribution controller and the second distribution controller acquire both of the first information and the second information, the first distribution controller may be configured to set the first torque based on the first information and the second information and cause the first motor to produce the first torque, and the second distribution controller may be configured to set the second torque based on the first information and the second information and cause the second motor to produce the second torque.

In the control device according to the first aspect, the first information may include information indicating at least one of a temperature, a charging amount and a voltage of the first battery, and the second information may include information indicating at least one of a temperature, a charging amount and a voltage of the second battery.

In the control device according to the first aspect, the distribution controller may be configured to, when neither the first system nor the second system is defective, specify a battery having a higher predetermined performance among the first battery and the second battery based on the first information and the second information, and, among the first motor and the second motor, cause one motor, which produces torque by electric power of the specified battery, to produce the torque larger than that of the other motor.

In the control device according to the first aspect, the distribution controller may be configured to determine that the first system is defective when a power supply from the first battery to the control device is stopped, and determine that the second system is defective when a power supply from the second battery to the control device is stopped.

A second aspect of the disclosure relates to a control method that is executed by a control device connected to a first system and a second system. The first system includes a first battery, a first battery monitoring unit that monitors a state of the first battery, and a first motor that produces torque for steering by electric power of the first battery, and the second system includes a second battery, a second battery monitoring unit that monitors a state of the second battery, and a second motor that produces torque for steering by electric power of the second battery. The control device is configured to perform steering control of a vehicle by the electric power of the first battery and the second battery. The control method includes calculating a total torque to be produced, and controlling output distribution of the first motor and the second motor such that a sum of a first torque produced by the first motor and a second torque produced by the second motor is the total torque. The controlling of the output distribution includes, when the first system is defective, causing the second motor to produce the total torque, when the second system is defective, causing the first motor to produce the total torque, and, when neither the first system nor the second system is defective, acquiring first information indicating the state of the first battery from the first battery monitoring unit, acquiring second information indicating the state of the second battery from the second battery monitoring unit, setting the first torque and the second torque based on the first information and the second information such that predetermined performance of the first battery and the second battery is within an allowable range, causing the first motor to produce the first torque, and causing the second motor to produce the second torque.

A third aspect of the disclosure relates to a non-transitory computer readable medium storing a control program that causes a computer of a control device to execute a process. The control device is connected to a first system and a second system. The first system includes a first battery, a first battery monitoring unit that monitors a state of the first battery, and a first motor that produces torque for steering by electric power of the first battery, and the second system includes a second battery, a second battery monitoring unit that monitors a state of the second battery, and a second motor that produces torque for steering by electric power of the second battery. The control device is configured to perform steering control of a vehicle by the electric power of the first battery and the second battery. The process includes calculating a total torque to be produced and controlling output distribution of the first motor and the second motor such that a sum of a first torque produced by the first motor and a second torque produced by the second motor is the total torque. The controlling of the output distribution includes, when the first system is defective, causing the second motor to produce the total torque, when the second system is defective, causing the first motor to produce the total torque, and when neither the first system nor the second system is defective, acquiring first information indicating the state of the first battery from the first battery monitoring unit, acquiring second information indicating the state of the second battery from the second battery monitoring unit, setting the first torque and the second torque based on the first information and the second information such that predetermined performance of the first battery and the second battery is within an allowable range, causing the first motor to produce the first torque, and causing the second motor to produce the second torque.

According to the aspects of the disclosure described above, in the control device of the electric power steering apparatus having two systems, each including each a set of the battery and the motor, when both the two systems operate normally, the torque distribution ratio of the motors is controlled according to the state of the battery of each system and the performance of the battery of each system is kept in the allowable range. Therefore, it is possible to improve stability of operation of each system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Overview

In an electric power steering apparatus having two systems, each including a battery and a motor, when each system is operating normally, the control device according to the embodiment of the disclosure makes the distribution ratio of the torque to be produced by the motor of each system vary depending on a state of the battery of each system, instead of making the distribution ratio equally fixed. As a result, a predetermined performance of the battery of each system is maintained within an allowable range, and the stability of the operation of each system is improved.

EMBODIMENT

Hereinafter, an embodiment of the disclosure will be described in detail with reference to the drawings.

Configuration

Figure 1:
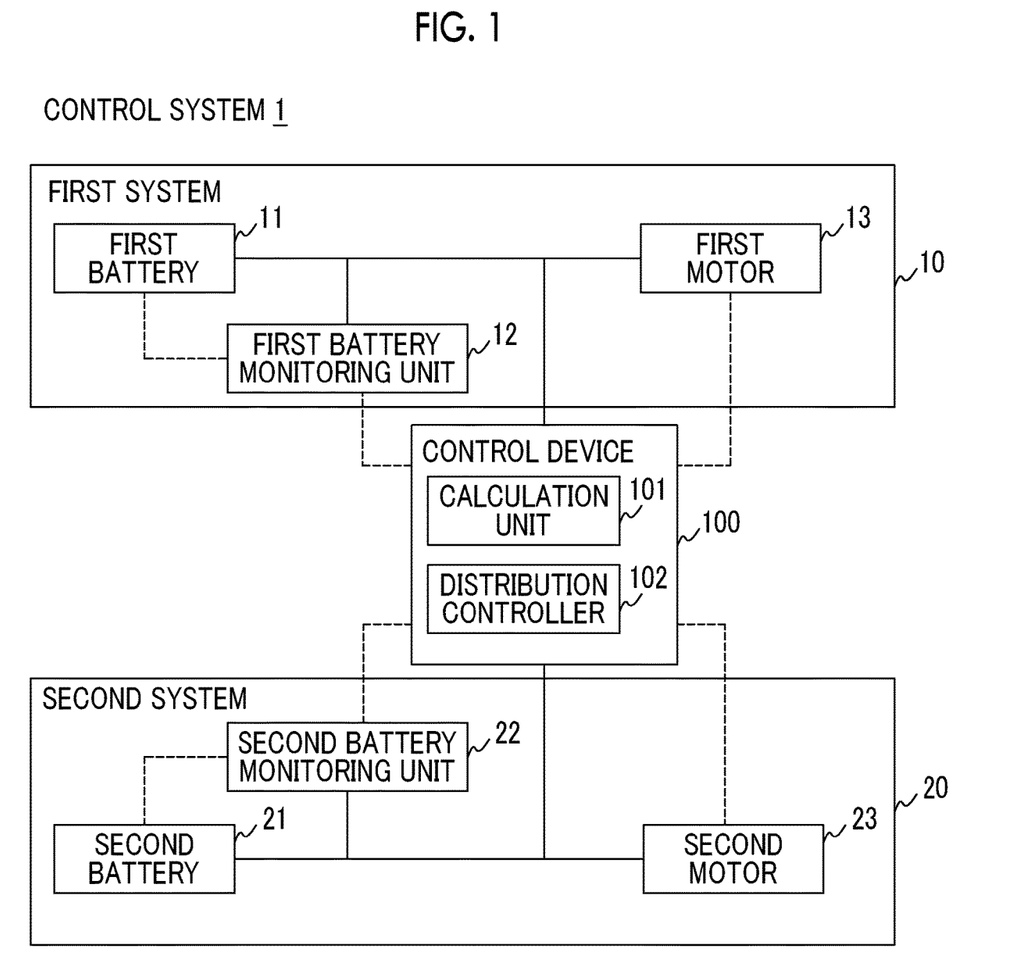
FIG. 1 is a view showing functional blocks of a control system according to an embodiment of the disclosure.

FIG. 1 shows functional blocks of a control system 1 according to the embodiment. The control system is an electric power steering apparatus including a first system 10, a second system 20, and a control device 100. In FIG. 1, a power line is indicated by a solid line and a communication line is indicated by a dotted line. The first system 10 includes a first battery 11, a first battery monitoring unit 12, and a first motor 13. The first battery monitoring unit 12 operates with, for example, electric power from the first battery 11, and monitors a state of the first battery 11. The first motor 13 produces a torque for steering. The second system 20 includes a second battery 21, a second battery monitoring unit 22, and a second motor 23. The second battery monitoring unit 22 operates, for example, with electric power from the second battery 21, and monitors a state of the second battery 21. The second motor 23 produces a torque for steering. The first system 10 and the second system 20 may include other devices (not shown) to which electric power is supplied by the first battery 11 and the second battery 21, respectively. In addition, each of the first battery 11 and the second battery 21 may include a plurality of batteries.

The torque produced by the first motor 13 and the torque produced by the second motor 23 are transmitted to a steering device (not shown), and the sum of the torques is converted into a force for changing the direction of tires. Torque transmission and conversion mechanisms are not limited, and column-assist type, rack-assist type, and the like can be employed as appropriate.

The control device 100 is connected to the first system 10 and the second system 20, and performs steering control of a vehicle to be described later by electric power of the first battery 11 and the second battery 21. The control device 100 can operate as long as electric power is supplied from at least one of the first battery 11 and the second battery 21. The control device 100 includes a calculation unit 101 that calculates the total torque to be produced for steering and a distribution controller 102 that controls the outputs of the first motor 13 and the second motor 23.

Process

Figure 2:
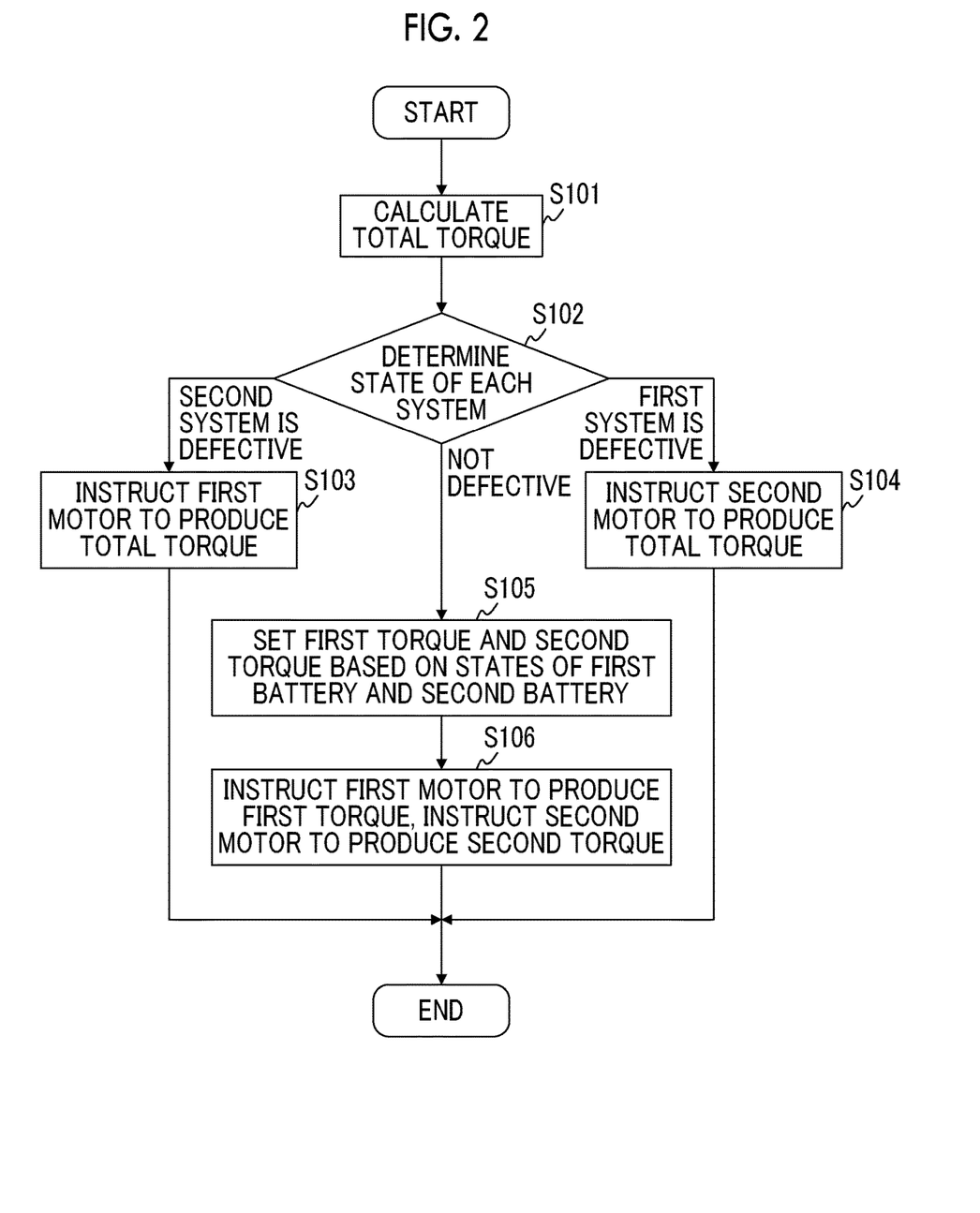
FIG. 2 is a flowchart showing a process according to the embodiment of the disclosure.

FIG. 2 is a flowchart showing a process of the control device 100 according to the embodiment. The process is started by the control device 100 detecting a steering operation of a user. The control device 100 can detect the steering operation by receiving a sensor value such as a steering angle, an angular velocity or an angular acceleration by steering operation, a torque by the user's steering force, or the like, for example, from an external sensor. Alternatively, the process may be started by the control device 100 receiving a request value for torque production from an external electronic control unit (ECU) that performs driving assistance processing such as autonomous driving.

(Step S101): The calculation unit 101 of the control device 100 calculates the total torque to be produced by the first motor 13 and the second motor 23 by performing a predetermined calculation based on the sensor value received by the control device 100. The method of calculating the total torque is not limited. In calculating the total torque, in addition to the sensor value, a vehicle speed or the like may be further acquired from the vehicle speed sensor for the purpose of use. When the control device 100 receives a request value for torque production from an external ECU, the request value for torque production can be set to the total torque.

(Step S102): The distribution controller 102 of the control device 100 determines whether the first system 10 and the second system 20 are in a normal state or in a defective state for operations of the first system 10 and the second system 20. For example, when the electric power supply from the first battery 11 to the control device 100 is stopped, first information to be obtained from the first battery monitoring unit 12, which will be described below, indicates abnormality of the first battery 11 or a notification indicating abnormality of the first motor 13 is received from a controller included in the first motor 13, the distribution controller 102 can determine that the first system 10 is defective. Similarly, for example, when the electric power supply from the second battery 21 to the control device 100 is stopped, second information to be obtained from the second battery monitoring unit 22, which will be described below, indicates abnormality of the second battery 21 or a notification indicating abnormality of the second motor 23 is received from a controller included in the second motor 23, the distribution controller 102 can determine that the second system 20 is defective. The determination of whether the states of the first system 10 and the second system 20 are normal or defective may be made by another functional block which is provided in a vehicle but is not shown in FIG. 1, instead of the determination by the distribution controller 102 itself, and the distribution controller 102 may acquire the determination result from other functional blocks.

When the first system 10 is not defective and the second system 20 is defective, the process proceeds to step S103. When the first system 10 is defective and the second system 20 is not defective, the process proceeds to step S104. When neither the first system 10 nor the second system 20 is defective, the process proceeds to step S105.

(Step S103): The distribution controller 102 transmits, to the first motor 13, an instruction to produce the total torque calculated in step S101 to cause the first motor 13 to produce the total torque. Although the process ends with it, the process is repeated from step S101 by detecting the steering operation by the user again or receiving the request for torque production from the ECU again.

(Step S104): The distribution controller 102 transmits, to the second motor 23, an instruction to produce the total torque calculated in step S101 to cause the second motor 23 to produce the total torque. Although the process ends with it, the process is repeated from step S101 by detecting the steering operation by the user again or receiving the request for torque production from the ECU again.

(Step S105): The distribution controller 102 sets the first torque that is the torque to be produced by the first motor 13 and the second torque that is the torque to be produced by the second motor 23. The first torque and the second torque are set by the distribution controller 102 as follows. That is, the sum of the first torque and the second torque is set so as to be the total torque calculated in step S101. The first torque is set such that the state of the first battery 11 is within a predetermined allowable range even when the first motor 13 produces the first torque. The second torque is set such that the state of the second battery 21 is within a predetermined allowable range even when the second motor 23 produces the second torque. In order to make the settings, the distribution controller 102 acquires the state of the first battery 11 from the first battery monitoring unit 12 as the first information, and the state of the second battery 21 from the second battery monitoring unit 22 as the second information. Here, the states of the first battery 11 and the second battery 21 are, for example, voltages of the batteries, respectively.

Figure 3:
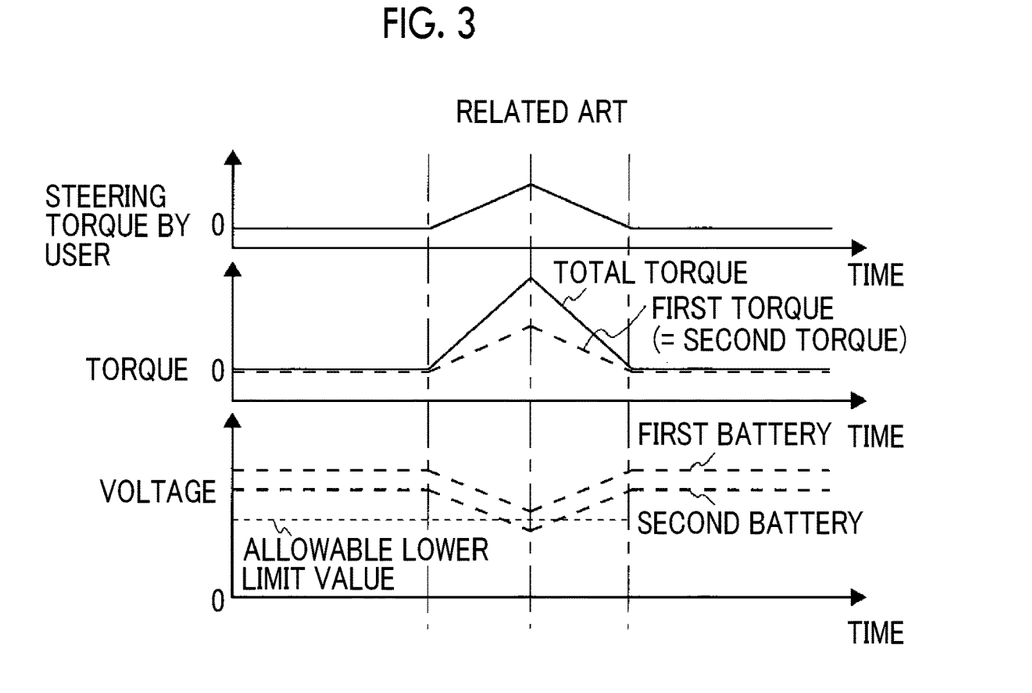
FIG. 3 is a graph showing an example of torque distribution according to the related art.
Figure 4:
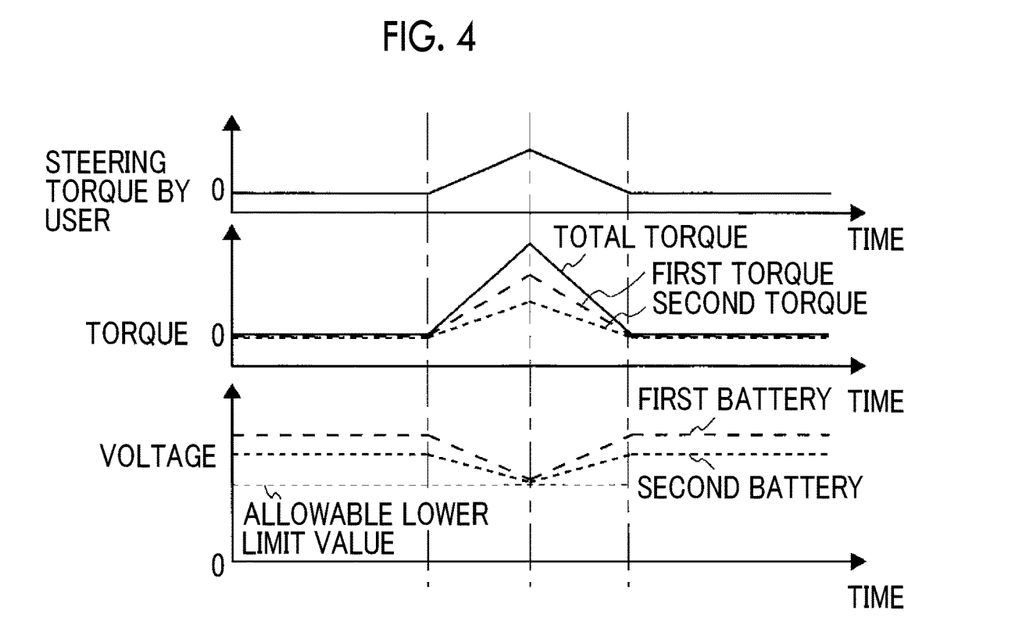
FIG. 4 is a graph showing an example of torque distribution according to the embodiment of the disclosure.

FIG. 3 shows an example of the related art in which the total torque is distributed to the first torque and the second torque, and FIG. 4 shows an example of the embodiment in which the total torque is distributed to the first torque and the second torque. FIGS. 3 and 4 are graphs where a horizontal axis represents time, and vertical axes represent the torque by the steering force of the user, the total torque calculated by the calculation unit 101 and the first torque and the second torque set by the distribution controller 102, and the voltages of the first battery 11 and the second battery 21, respectively. In the example shown in FIGS. 3 and 4, the total torque is calculated based on the torque by the steering force of the user, and the size is assumed to be proportional to the torque by the steering force. Further, it is assumed that the voltage of the second battery 21 is smaller than that of the first battery 11.

As in the example of the related art shown in FIG. 3, when the first torque and the second torque are made equal, the first battery 11 that supplies electric power to the first motor 13 to produce the first torque and the second battery 21 that supplies electric power to the second motor 23 to produce the second torque are voltage-dropped. However, even when the voltage value of the first battery 11 is within the allowable range, the voltage value of the second battery 21 may fall below the allowable lower limit value, and thus, the second battery 21 may not supply sufficient power. In this case, the torque produced by the second motor 23 receiving electric power from the second battery 21 may decrease or when another device performs resetting, the operation may be unstable.

On the other hand, in the example of the embodiment shown in FIG. 4, when the first torque and the second torque are set such that the distribution ratio of the first torque is larger than the distribution ratio of the second torque in response to the voltage of the first battery 11 being higher than the voltage of the second battery 21, the voltages of both of the batteries can be within the allowable range even if the voltage drop occurs in each of the first battery 11 and the second battery 21. As the performance difference between the first battery 11 and the second battery 21 increases, the distribution ratio of the torque produced by the motor receiving electric power from the battery having the higher performance increases. In this way, the states of the first battery 11 and the second battery 21 are kept within the predetermined allowable ranges to thereby secure the torques produced by the first motor 13 and the second motor 23 and guarantee the operation of the other devices, which makes it possible to improve stability of the control system 1.

(Step S106): The distribution controller 102 transmits, to the first motor 13, an instruction to produce the first torque to cause the first motor 13 to produce the first torque. Further, the distribution controller 102 transmits, to the second motor 23, an instruction to output the second torque to cause the second motor 23 to produce the second torque. Although the process ends with it, the process is repeated from step S101 by detecting the steering operation by the user again or receiving the request for torque production from the ECU again.

In the embodiment, the distribution controller 102 acquires all voltages for the first information indicating the state of the first battery 11 and the second information indicating the state of the second battery 21, but the embodiment is not limited thereto. The distribution controller 102 may acquire, from the first battery monitoring unit 12 and the second battery monitoring unit 22, values such as the battery temperature, the state of charge (SOC), power can be output by the battery which is estimated based on SOC, internal resistance, or the like, in place of the voltage or in addition to the voltage. Further, the distribution controller 102 may estimate performance values representing other states and performance (collectively, performance) based on the information acquired from the first battery monitoring unit 12 and the second battery monitoring unit 22.

In the embodiment, the distribution controller 102 sets the first torque and the second torque such that the voltage of the first battery 11 and the voltage of the second battery 21 are within the allowable ranges, but the embodiment is not limited thereto. The distribution controller 102 sets the first torque and the second torque such that one or more performance values of the first battery 11 and the second battery 21 such as voltage, current, power, battery temperature, SOC, and the like are within a predetermined allowable range. As described above, the contents of the information acquired from the first battery monitoring unit 12 and the second battery monitoring unit 22 by the distribution controller 102 and the contents of performance to be controlled so as to be within the predetermined allowable range based on the contents of the information are not limited and may be the same or different as long as the state or performance of the battery is expressed, and the state and performance can be estimated.

Further, in the embodiment, the distribution controller 102 specifies a battery having higher performance (higher voltage) based on the first information and the second information, among the first battery 11 and the second battery 21, and, among the first motor 13 and the second motor 23, causes one motor which receives electric power from the specified battery to produce torque larger than that of the other motor. When performance values are compared, depending on allowable ranges of rated values, characteristics, performance values of the first battery 11 and the second battery 21, characteristics of loads of the first system 10 and the second system 20 including the first motor 13 and the second motor 23, respectively, or the like, comparison may be made after multiplying or adding a constant to one of the performance values.

Modified Example

Figure 5:
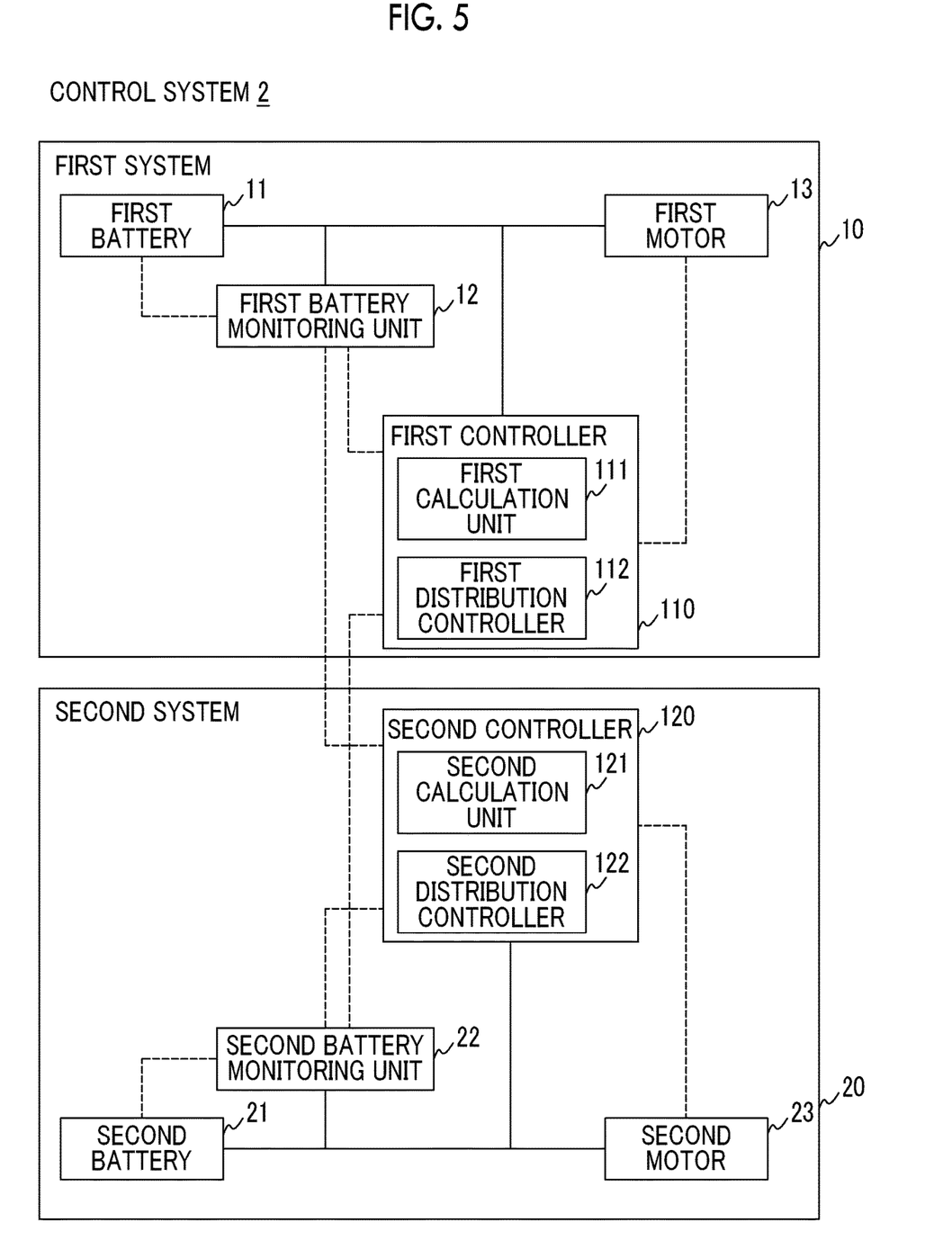
FIG. 5 is a view showing functional blocks of a control system according to a modified example of the embodiment of the disclosure.

It should be noted that the control device may be provided for each system. FIG. 5 shows functional blocks of a control system 2. In the example, the same functions as those of the control device 100 described above are obtained by a first controller 110 included in the first system 10 and a second controller 120 included in the second system 20.

The calculation unit described above includes a first calculation unit 111 provided in the first controller 110 and a second calculation unit 121 provided in the second controller 120.

The distribution controller described above includes a first distribution controller 112 provided in the first controller 110 and a second distribution controller 122 provided in the second controller 120. The first distribution controller 112 operates with electric power of the first battery 11 to control the output of the first motor 13. The second distribution controller 122 operates with electric power of the second battery 21 to control the output of the second motor 23.

The process is the same as that of the above-described Steps S101 to S106, but supplementary description is appropriately added below. In step S101, when the first system 10 and the second system 20 are operating normally, the first calculation unit 111 operates with electric power of the first battery 11 to calculate the total torque. The second calculation unit 121 operates with the electric power of the second battery 21 to calculate the total torque. The total torque calculated by the first calculation unit 111 and the total torque calculated by the second calculation unit are calculated by the same method and have the same value. When the first system 10 is defective, the first calculation unit 111 cannot calculate the total torque. When the second system 20 is defective, the second calculation unit 121 cannot calculate the total torque.

In Step S102, when the first system 10 is not defective, the first distribution controller 112 determines whether or not the second system 20 is in a normal operation state or a defective state. On the other hand, when the second system 20 is not defective, the second distribution controller 122 determines whether or not the first system 10 is in a normal operation state or a defective state.

When the first system 10 is not defective and the second system 20 is defective, in Step S103, the first distribution controller 112 transmits, to the first motor 13, an instruction to produce the total torque to cause the first motor 13 to produce the total torque.

When the first system 10 is defective and the second system 20 is not defective, in Step S104, the second distribution controller 122 transmits, to the second motor 23, an instruction to produce the total torque to cause the second motor 23 to produce the total torque.

When neither the first system 10 nor the second system 20 is defective, in Step S105, each of the first distribution controller 112 and the second distribution controller 122 acquire both of the first information and the second information. The first distribution controller 112 sets the first torque based on the first information and the second information. The second distribution controller 122 sets the second torque based on the first information and the second information. The first distribution controller 112 and the second distribution controller 122 set the first torque and the second torque, respectively, based on the same method as the above-described distribution controller 102. Further, in Step S106, the first distribution controller 112 transmits, to the first motor 13, an instruction to produce the first torque to cause the first motor 13 to produce the second torque. Further, the second distribution controller 122 transmits, to the second motor 23, an instruction to output the second torque to cause the second motor 23 to produce the second torque. The control system 2 can perform the same control as the control system 1 by the configuration and process of the first controller 110 and the second controller 120 as described above.

Effect

As described above, according to the embodiment of the disclosure, in an electric power steering apparatus having two systems each including a battery and a motor, when each of the systems is operating normally, the ratio of torque to be produced by the motor of each system is changed depending of the state of the battery of each system and a predetermined performance of the battery of each system is kept within an allowable range. In this way, it is possible to guarantee the torque produced by the motor and the operation of other devices and improve the stability of operation of each system.

It should be noted that the disclosure can also be applied to devices other than the electric power steering apparatus as long as two systems each including a battery and an actuator are provided. That is, in the embodiment, when the control device controls the braking force of the brake, for example, instead of the torque value of the motor, it is possible to constitute a brake device having two systems each including the battery and the brake actuator.

Although the embodiment of the disclosure has been described above, the disclosure can also be applied to a control device, a control system, a control method executed by a processor included in the control device, a control program, and a non-transitory computer readable medium storing a control program, or a vehicle in which the control device is mounted.

The disclosure is useful for a control device such as an electric power steering apparatus mounted on a vehicle or the like.

What is claimed is:

1. A control device that is connected to a first system and a second system, the first system including a first battery, a first battery monitoring unit that monitors a state of the first battery, and a first motor that produces torque for steering by electric power of the first battery, the second system including a second battery, a second battery monitoring unit that monitors a state of the second battery, and a second motor that produces torque for steering by electric power of the second battery, the control device being configured to perform steering control of a vehicle by the electric power of the first battery and the electric power of the second battery, the control device comprising:

a calculation unit configured to calculate a total torque to be produced; and a distribution controller configured to control output of the first motor and the second motor such that a sum of a first torque produced by the first motor and a second torque produced by the second motor is the total torque, wherein the distribution controller is configured to when the first system is defective, cause the second motor to produce the total torque, when the second system is defective, cause the first motor to produce the total torque, and when neither the first system nor the second system is defective, acquire first information indicating the state of the first battery from the first battery monitoring unit, acquire second information indicating the state of the second battery from the second battery monitoring unit, set the first torque and the second torque based on the first information and the second information such that predetermined performance of the first battery and the second battery is within an allowable range, cause the first motor to produce the first torque, and cause the second motor to produce the second torque.

2. The control device according to claim 1, wherein the control device includes a first controller included in the first system; and a second controller included in the second system, wherein:

the calculation unit includes a first calculation unit provided in the first controller and configured to calculate the total torque by the electric power of the first battery, and a second calculation unit provided in the second controller and configured to calculate the total torque by the electric power of the second battery;

the distribution controller includes a first distribution controller provided in the first controller and configured to control the output of the first motor by the electric power of the first battery, and a second distribution controller provided in the second controller and configured to control the output of the second motor by the electric power of the second battery;

when the first system is defective, the second distribution controller is configured to cause the second motor to produce the total torque calculated by the second calculation unit;

when the second system is defective, the first distribution controller is configured to cause the first motor to produce the total torque calculated by the first calculation unit; and when neither the first system nor the second system is defective, both the first distribution controller and the second distribution controller acquire both of the first information and the second information, the first distribution controller is configured to set the first torque based on the first information and the second information and cause the first motor to produce the first torque, and the second distribution controller is configured to set the second torque based on the first information and the second information and cause the second motor to produce the second torque.

3. The control device according to claim 1, wherein:
the first information includes information indicating at least one of a temperature, a charging amount and a voltage of the first battery; and
the second information includes information indicating at least one of a temperature, a charging amount and a voltage of the second battery.

4. The control device according to claim 3, wherein the distribution controller is configured to, when neither the first system nor the second system is defective, specify a battery having a higher predetermined performance among the first battery and the second battery based on the first information and the second information, and, among the first motor and the second motor, cause one motor, which produces torque by electric power of the specified battery, to produce the torque larger than that of the other motor.

5. The control device according to claim 1, wherein the distribution controller is configured to determine that the first system is defective when a power supply from the first battery to the control device is stopped, and determine that the second system is defective when a power supply from the second battery to the control device is stopped.

6. A control method that is executed by a control device connected to a first system and a second system, the first system including a first battery, a first battery monitoring unit that monitors a state of the first battery, and a first motor that produces torque for steering by electric power of the first battery, the second system including a second battery, a second battery monitoring unit that monitors a state of the second battery, and a second motor that produces torque for steering by electric power of the second battery, the control device being configured to perform steering control of a vehicle by the electric power of the first battery and the electric power of the second battery, the control method comprising:
calculating a total torque to be produced; and
controlling output distribution of the first motor and the second motor such that a sum of a first torque produced by the first motor and a second torque produced by the second motor is the total torque,
wherein the controlling of the output distribution includes
when the first system is defective, causing the second motor to produce the total torque,
when the second system is defective, causing the first motor to produce the total torque, and
when neither the first system nor the second system is defective, acquiring first information indicating the state of the first battery from the first battery monitoring unit, acquiring second information indicating the state of the second battery from the second battery monitoring unit, setting the first torque and the second torque based on the first information and the second information such that predetermined performance of the first battery and the second battery is within an allowable range, causing the first motor to produce the first torque, and causing the second motor to produce the second torque.

7. A non-transitory computer readable medium storing a control program that causes a computer of a control device to execute a process, the control device being connected to a first system and a second system, the first system including a first battery, a first battery monitoring unit that monitors a state of the first battery, and a first motor that produces torque for steering by electric power of the first battery, the second system including a second battery, a second battery monitoring unit that monitors a state of the second battery, and a second motor that produces torque for steering by electric power of the second battery, the control device being configured to perform steering control of a vehicle by the electric power of the first battery and the electric power of the second battery, the process comprising:
calculating a total torque to be produced; and
controlling output distribution of the first motor and the second motor such that a sum of a first torque produced by the first motor and a second torque produced by the second motor is the total torque,
wherein the controlling of the output distribution includes
when the first system is defective, causing the second motor to produce the total torque,
when the second system is defective, causing the first motor to produce the total torque, and
when neither the first system nor the second system is defective, acquiring first information indicating the state of the first battery from the first battery monitoring unit, acquiring second information indicating the state of the second battery from the second battery monitoring unit, setting the first torque and the second torque based on the first information and the second information such that predetermined performance of the first battery and the second battery is within an allowable range, causing the first motor to produce the first torque, and causing the second motor to produce the second torque.

* * * * *